May 29, 1923.

J. BENJAMIN 1,457,206

LICENSE PLATE HOLDER, TAIL LIGHT, AND PARKING LIGHT

Filed June 30, 1922

J. Benjamin
INVENTOR

BY Victor J. Evans

ATTORNEY

WITNESS:

Patented May 29, 1923.

1,457,206

UNITED STATES PATENT OFFICE.

JACK BENJAMIN, OF NEW KENSINGTON, PENNSYLVANIA.

LICENSE-PLATE HOLDER, TAIL LIGHT, AND PARKING LIGHT.

Application filed June 30, 1922. Serial No. 571,878.

*To all whom it may concern:*

Be it known that I, JACK BENJAMIN, a citizen of the United States, residing at New Kensington, in the county of Westmoreland and State of Pennsylvania, have invented new and useful Improvements in License-Plate Holders, Tail Lights, and Parking Lights, of which the following is a specification.

This invention relates to license plate holders for automobiles and has for its object the provision of a novel device which will operate as a combined license plate holder and tail light, the device being so constructed that the license plate is contained within a glass covered case or box which will serve to protect the license plate and prevent it from becoming rusty or otherwise damaged by the weather.

An important object is the provision of a device of this character which is provided with illuminating means in the nature of an electric bulb held in a socket and passing through a hole in the license plate for illuminating the plate, the plate being covered with glass, and the glass cover being provided with a red area through which light from the bulb will pass for providing the conventional red tail light.

Another object is the provision of a parking lamp or light which is connected with a switch mechanism whereby to be automatically energized when the tail light is deenergized.

An additional object is the provision of a device of this character which will be simple and inexpensive in manufacture, efficient and durable in use and a general improvement in the art.

Figure 1:
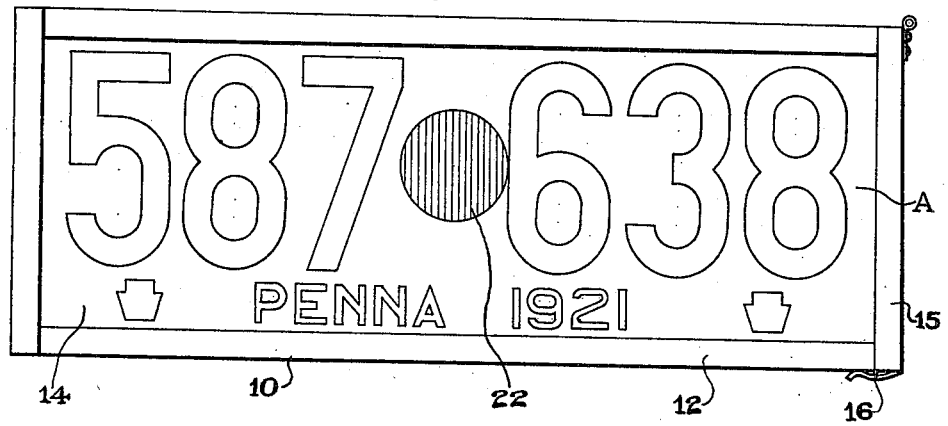
Figure 2:
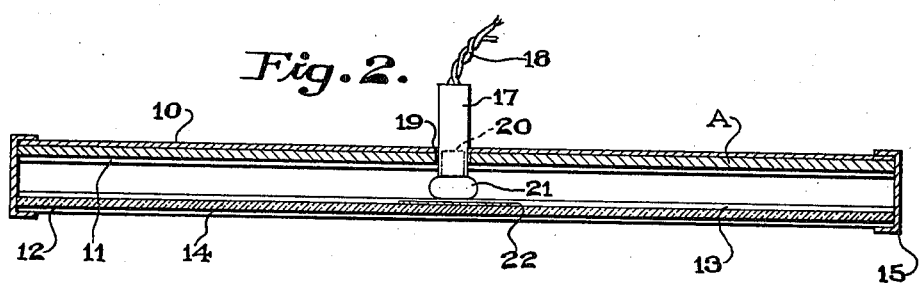
Figure 3:
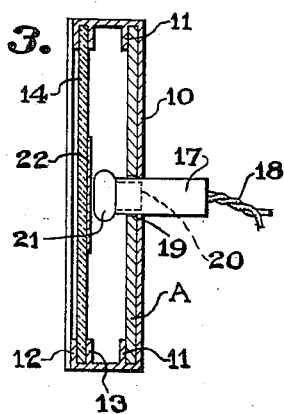

With the above and other objects and advantages in view the invention consists in the details of construction to be hereinafter more fully described and claimed and illustrated in the accompanying drawings, in which:

Figure 1 is a front elevation of the device,
Figure 2 is a longitudinal section
Figure 3 is a cross section.

Referring more particularly to the drawings I have shown my device as comprising a rectangular box like casing 10 of a size to receive the license plate indicated by the letter A. The upper and lower edges of this box are formed internally near the back with flanges 11 which operate as guides for holding the license plate in position while the upper and lower edges are provided at the open front of the casing with flanges 12 and 13 which operate as retaining means for a glass pane 14 which covers the open front of the box or casing. One end of the casing is closed by a permanent end wall while the other end is provided with a hinged door 15 held normally in closed position by any suitable catch means indicated at 16.

Suitably secured on the back of the casing at the outside thereof is a socket 17 which has the usual terminal wires 18 leading to any suitable source of current supply. The license plate A is formed centrally with a hole 19 which registers with a hole in the back wall of the casing, and passing through these holes is a socket 17 which holds the stem 20 of an incandescent bulb 21, the stem being engaged within the socket 17 in the usual manner.

Secured against the inner side of the glass pane is a disk 22 of transparent red material.

In the use of the device the door 15 is opened and the plate A is slid into place between the back of the casing and the flanges 11. The bulb 21 is then inserted into the socket and will of course be energized when current is passing through the wires 18. The glass 14 is then slid into place between the flanges 12 and 13 and the door 15 is closed.

From the foregoing description and a study of the drawings it will be apparent that the device will operate not only to hold the license plate without other securing means but will also protect it from becoming rusty or otherwise damaged by the weather while at the same time the light from the incandescent bulb will illuminate the license plate and also shine through the red disk so as to constitute an efficient tail light.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A device of the character described comprising an elongated rectangular casing adapted to hold a license plate disposed therein against the back wall thereof, a removable glass front for the casing, the back of the casing and the license plate being formed with registering holes, a socket passing through said holes, an incandescent lamp within the casing engaged within said socket and a transparent red area on the glass plate opposite the incandescent lamp.

2. A device of the character described comprising an elongated rectangular casing, the top and bottom of the casing being provided near its back with spaced flanges and being provided near its front with other spaced flanges, said casing being adapted to hold a license plate engaged between the first named flanges and the rear wall, said license plate and the back of the casing being formed with registering holes, a socket passing through said holes, an incandescent bulb engaged within the socket, and a glass pane engaged between the second named flanges and carrying a transparent red disk located opposite said bulb.

In testimony whereof I affix my signature.

JACK BENJAMIN.